United States Patent [19]

Garcia et al.

[11] Patent Number: 5,169,688

[45] Date of Patent: Dec. 8, 1992

[54] ANTISTATIC SURFACE MODIFICATION OF PVC

[75] Inventors: Dana S. Garcia, Plainsboro; Joseph Silbermann, Millburn, both of N.J.

[73] Assignee: Atochem North America, Inc., Philadelphia, Pa.

[21] Appl. No.: 662,206

[22] Filed: Feb. 27, 1991

[51] Int. Cl.$^5$ .......................... B05D 3/04; B05D 3/10
[52] U.S. Cl. ................................ 427/307; 252/500; 427/336; 524/99; 524/251; 528/492
[58] Field of Search ................. 427/307, 336; 524/99, 524/251; 528/492; 252/500

[56] References Cited

U.S. PATENT DOCUMENTS

| | | | |
|---|---|---|---|
| 2,125,827 | 8/1938 | Turkington | 91/70 |
| 3,043,709 | 7/1962 | Amborski | 117/7 |
| 3,192,074 | 6/1965 | Newhard, Jr. | 148/6.14 |
| 3,297,462 | 1/1967 | Fanning | 117/33.3 |
| 3,309,220 | 3/1967 | Osteen | 117/33.3 |
| 3,519,462 | 7/1970 | Bristol et al. | 117/33.3 |
| 3,594,264 | 7/1971 | Urban | 161/168 |
| 3,617,330 | 11/1971 | Peilstocker | 117/33.3 |
| 3,783,011 | 1/1974 | Chauffourreaux | 117/106 R |
| 3,892,889 | 7/1975 | Cohnen et al. | 117/33.3 |
| 4,126,660 | 11/1978 | Lemkowicz et al. | 264/101 |
| 4,129,667 | 12/1978 | Lorenz et al. | 427/44 |
| 4,146,658 | 3/1979 | Humphrey | 427/160 |
| 4,210,556 | 7/1980 | Castro et al. | 528/492 X |
| 4,276,138 | 6/1981 | Asai et al. | 528/492 X |
| 4,322,455 | 3/1982 | Olson et al. | 427/160 |
| 4,323,597 | 4/1982 | Olson | 427/160 |
| 4,349,602 | 9/1982 | Ching | 428/331 |
| 4,349,607 | 9/1982 | Ching | 428/412 |
| 4,353,959 | 10/1982 | Olson et al. | 428/331 |
| 4,382,109 | 5/1983 | Olson et al. | 428/331 |
| 4,396,678 | 8/1983 | Olson | 428/412 |
| 4,439,494 | 3/1984 | Olson | 428/412 |
| 4,511,489 | 4/1985 | Requejo et al. | 252/172 |
| 4,547,414 | 10/1985 | Eguchi | 428/36 |
| 4,556,606 | 12/1985 | Olson | 428/412 |
| 4,636,408 | 1/1987 | Anthony et al. | 427/160 |
| 4,661,547 | 4/1987 | Harada et al. | 524/251 X |
| 4,770,905 | 9/1988 | Silbermann et al. | 427/160 |
| 4,792,465 | 12/1988 | Silbermann et al. | 427/160 |
| 4,792,492 | 12/1988 | Lee, Jr. | 428/411.1 |
| 4,865,880 | 9/1989 | Silbermann et al. | 427/160 |
| 4,868,011 | 9/1989 | Burchill et al. | 427/160 |
| 4,877,529 | 10/1989 | Pasternek et al. | 210/651 X |
| 4,913,082 | 4/1990 | Silbermann et al. | 118/419 |
| 4,919,972 | 4/1990 | Conrad et al. | 427/160 |
| 4,925,739 | 5/1990 | Silbermann et al. | 428/522 |

FOREIGN PATENT DOCUMENTS

| | | |
|---|---|---|
| 612206 | 6/1962 | Belgium . |
| 1027428 | 3/1978 | Canada . |
| 134523 | 3/1985 | European Pat. Off. . |
| 151961 | 8/1985 | European Pat. Off. . |
| 2808005 | 8/1979 | Fed. Rep. of Germany . |
| 2808036 | 8/1979 | Fed. Rep. of Germany . |
| 1293186 | 4/1961 | France . |
| 39037 | 3/1975 | Israel . |
| 921032 | 3/1963 | United Kingdom . |

OTHER PUBLICATIONS

European Search Report No. 92,301,546, dated May 21, 1992.

Katz et al., "Ultraviolet Protection of Transparent PVC Sheets by Diffusion Coatings," Div. Org. Coatings & Plastics, 36(1) pp. 202-206 (1976).

Primary Examiner—Michael Lusignan
Attorney, Agent, or Firm—Finnegan, Henderson, Farabow, Garrett & Dunner

[57] ABSTRACT

At least one antistatic agent is incorporated into a thermoplastic polymer by contacting a polyvinyl chloride polymer with a solution comprising a solvent capable of swelling the PVC surface and at least one antistatic agent selected from the group consisting of 1-dodecylpyridinium chloride monohydrate and $(R^1)_n(R^2)_m$ ammonium halide, wherein n and m are integers of from 0-4 and n+m=4, and wherein $R^1$ and $R^2$ can be different or the same and are alkyl groups of from 1 to 20 carbon atoms.

35 Claims, No Drawings

ANTISTATIC SURFACE MODIFICATION OF PVC

FIELD OF THE INVENTION

This invention is directed to imparting antistatic properties to a thermoplastic polymer, especially a polyvinyl chloride polymer.

BACKGROUND OF THE INVENTION

Antistatic agents have been applied to polymers by either an external or an internal method. The external method, which generally involves dipping or wiping a solution of antistatic agent on the polymer, has heretofore been inadequate. The external process, due to the nature of the solvent used, generally alcohol or water, does not result in an adequate incorporation of the antistatic agent into the polymer, and thus, results in almost complete loss of the antistatic property following washing.

The internal method, which generally involves incorporation of an antistatic agent into the polymeric material prior to shaping into solid form, has also heretofore been inadequate. The internal process has been largely uneconomical and inefficient because the antistatic agent is present substantially in the interior of the shaped article, where it does not function effectively to prevent surface static properties. The internal process is also limited in the choice of antistatic agents and requires significantly large quantities of antistatic agent.

SUMMARY OF THE INVENTION

Accordingly, the present invention is directed to a method of incorporating at least one antistatic agent into a thermoplastic polymer and is directed to the antistatic solution composition which overcomes the problems outlined above. More specifically, the process of the present invention and the antistatic solution composition of the present invention are directed to overcoming the above problems with respect to imparting antistatic properties to a polyvinyl chloride polymer.

In accordance with one aspect of the present invention, the process of the present invention comprises the step of contacting a polyvinyl chloride polymer with a solution comprising a solvent capable of swelling the PVC surface and at least one antistatic agent selected from the group consisting of 1-dodecylpyridinium chloride monohydrate and $(R^1)_n(R^2)_m$ ammonium halide, wherein n and m are integers of from 0–4 and n+m=4, and wherein $R^1$ and $R^2$ can be different or the same and are alkyl groups of from 1 to 20 carbon atoms.

Although the method of the present invention has characteristics of an external process, the present invention provides a permanence not found in the prior art because the antistatic agent of the present invention not only exists on the surface of the PVC but also penetrates through the surface of the PVC.

In accordance with another aspect of the present invention, the antistatic solution composition of the present invention comprises a solvent capable of swelling the PVC surface and at least one antistatic agent selected from the group consisting of 1-dodecylpyridinium chloride monohydrate and $(R^1)_n(R^2)_m$ ammonium halide, wherein n and m are integers of from 0–4 and n+m=4, and wherein $R^1$ and $R^2$ can be different or the same and are alkyl groups of from 1 to 20 carbon atoms.

DETAILED DESCRIPTION OF THE INVENTION

The PVC may be contacted with the solution containing the antistatic agent in various ways. The contacting may involve a dipping, spraying, wiping, coating, or other type process, provided that the PVC and the antistatic agent solution are contacted for a sufficient time to allow the antistatic agent to penetrate into the PVC. For example, the process disclosed in U.S. Pat. No. 4,770,905 to Silbermann et al. may be used.

After the PVC and the antistatic agent solution are contacted for a sufficient time to allow the antistatic agent to penetrate into the PVC, the PVC can be washed with water and then subsequently dried.

The antistatic agent is at least one antistatic agent selected from the group consisting of 1-dodecylpyridinium chloride monohydrate and $(R^1)_nR^2)_m$ ammonium halide, wherein n and m are integers of from 0–4 and n+m=4, and wherein $R^1$ and $R^2$ can be different or the same and are alkyl groups of from 1 to 20 carbon atoms.

For the ammonium halide type antistatic agent disclosed above, $R^1$ and $R^2$ are selected such that they are soluble in the solvent and insoluble or only slightly soluble in water. $R^1$ and $R^2$ can each be a substituted or non-substituted alkyl group of from 1–20 carbon atoms.

Preferably, the antistatic agent is at least one antistatic agent selected from the group consisting of 1-dodecylpyridinium chloride monohydrate, (heptyl)$_n$(octyl)$_m$ ammonium bromide, and (hexyl)$_n$(octyl)$_m$ ammonium bromide, wherein n is an integer of from 2–4, m is an integer of from 0–2, and n+m=4.

Examples of the (hexyl)$_n$(octyl)$_m$ ammonium bromide antistatic agent are bihexyl bioctyl ammonium bromide, trihexyl octyl ammonium bromide, and tetrahexyl ammonium bromide. Examples of the (heptyl)$_n$(octyl)$_m$ ammonium bromide antistatic agent are biheptyl bioctyl ammonium bromide, triheptyl octyl ammonium bromide, and tetraheptyl ammonium bromide.

The ammonium halide antistatic agents of this invention are typically preferred over the 1-dodecylpyridinium antistatic agent because the ammonium halide antistatic agents are water insoluble but solvent soluble. The 1-dodecylpyridinium antistatic agent is somewhat soluble in water and, hence, some of it may be removed from the PVC during washing. Nevertheless, the 1-dodecylpyridinium antistatic agent can be effectively used in the present invention.

The solvent used for contacting the antistatic agent with the PVC can be any solvent which swells the PVC surface and which is soluble with the antistatic agent. Preferably, the solvent can be methylene chloride, dimethyl sulfoxide (DMSO) or N-methyl pyrrolidone (NMP).

The antistatic agent concentration by weight in the solvent is preferably from about 1% to about 30%, and more preferably from about 10% to about 20%. The solution containing the antistatic agent is contacted with the PVC preferably from about 2 to about 60 seconds.

Other process variables such as the temperature of reaction are not critical to the invention and can readily be determined by one of ordinary skill in the art. For some embodiments of this invention, raising the solution temperature when contacting the antistatic solution with the PVC surface may increase the speed of absorption of the antistatic solution or agent.

The specific examples below will enable the invention to be better understood. However, they are given merely by way of guidance and do not imply any limitations.

EXAMPLE 1

PVC samples (3.5×3.5 inches) were dipped in a methylene chloride solution containing various concentrations of 1-dodecylpyridinium chloride monohydrate. Following the dipping process, the sample was washed with water and air dried.

A similar process was employed for a $CH_3OH$ solution containing 1-dedecylpyridinium chloride monohydrate. Not wishing to be bound by theory, the difference between the two solutions is in their ability to swell the PVC sample. On the time scale of the experiment, 2–60 sec., the methylene chloride diffuses through the top layers of the PVC sample and permits the co-diffusion of the 1-dodecylpyridinium salt in the polymer.

The effect of the treatment was then evaluated by measuring the Surface Resistivity (Rs) and the Decay Time (sec). The Surface Resistivity was measured according to ASTM D257 and the Decay Time according to the Fed. Test Method STD No. 1010, Method 4046. Untreated samples were also measured for comparative purposes.

The results are shown in Table I for PVC samples treated as described above. The data in Table I illustrates the incorporation of 1-dodecylpyridinium chloride in those PVC samples treated with the $CH_2Cl_2$ solution and absence of incorporation for the $CH_3OH$ solution treated samples. As a result, the $CH_2Cl_2$ solution treated samples exhibited lower surface resistivity (Rs) than the untreated control. Minimal effect was observed with the $CH_3OH$ solution treated samples.

These effects were even more dramatically illustrated in the decay times (see Table I). The $CH_2Cl_2$ solution treated samples have no initial charge, accept the full 5000V applied and decay in a short time, 0.038–5.735 sec. The $CH_3OH$ treated and untreated samples exhibit some initial charge, do not accept the full charge and decay over long time scales or the decay time could not be measured due to less than full charging.

The antistatic agent/$CH_2Cl_2$ of the present invention also exhibited at least a 30 day degree of permanence as shown by the Rs values on day 1 and day 37 (see Table I).

EXAMPLE 2

PVC samples were dipped in a methylene chloride solution containing various concentrations of tetrahexyl ammonium bromide in the same manner as in Example 1. Table 2 shows the results for the as treated samples. Table 3 shows the degree of permanence after various post-treatments. Table 4 shows the degree of permanence as a function of time.

It will be apparent to those skilled in the art that various modifications and variations can be made in the present invention without deviating form the scope or spirit of the invention. Thus, it is intended that the present invention covers the modifications and variations of this invention provided that these come within the scope of the following claims or their equivalents.

TABLE I

Evaluation of 1-Dodecylpridinium Chloride (1DDPC1) as Antistat for PVC
PVC sample 0.04 inch thick, 2 phr TiO2

| | | | | | 50% RH, 21.1 C., 5 KV, 60 sec | | | 90% | 50% RH, 22 C., 500 V, 60 sec | |
|---|---|---|---|---|---|---|---|---|---|---|
| Sample # | Solvent | 1DDPCl Conc (wt. %) | H2O wash after treatment | Treatment time (sec) | % 1DDPCl xth | Initial charge (V) | Accepted charge (V) | Decay time (sec) | Day 1 Rs (ohm/sq.) | Day 37 Rs (ohm/sq.) |
| 1 | none | — | yes | — | 0 | 50 | 1000 | nmt | 5.0 E + 14 | 3.0 E + 14 |
| 2 | $CH_2Cl_2$ | 20.0 | yes | 2 | 0.001011 | 0 | 5000 | 0.038 | 2.0 E + 11 | 7.0 E + 10 |
| 3 | $CH_2Cl_2$ | 20.0 | yes | 60 | 0.005000 | 0 | 5000 | 0.137 | 2.0 E + 11 | 2.0 E + 10 |
| 4 | $CH_2Cl_2$ | 10.0 | yes | 2 | 0.001090 | 0 | 5000 | 0.115 | 7.0 E + 10 | 1.0 E + 10 |
| 5 | $CH_2Cl_2$ | 10.0 | yes | 60 | 0.006500 | 0 | 5000 | 0.388 | 2.0 E + 11 | 5.0 E + 10 |
| 6 | $CH_2Cl_2$ | 5.0 | yes | 2 | 0.001100 | 0 | 5000 | 5.735 | 4.0 E + 12 | 6.0 E + 11 |
| 7 | $CH_2Cl_2$ | 5.0 | yes | 60 | 0.005740 | 0 | 5000 | 0.467 | 1.0 E + 10 | 2.0 E + 11 |
| 8 | $CH_2Cl_2$ | 2.5 | yes | 60 | 0.002930 | 0 | 4500 | 1.052 | 2.0 E + 11 | 3.0 E + 11 |
| 9 | $CH_2Cl_2$ | 1.0 | yes | 60 | 0.000912 | 0 | 5000 | 1.493 | 3.0 E + 12 | 2.0 E + 13 |
| | | | | | | | | | 50% RH, 29 C. | 45% RH, 23 C. |
| 10 | none | — | yes | — | 0 | 50 | 1000 | nmt | 1.0 E + 13 | 2.0 E + 13 |
| 11 | $CH_3OH$ | 10.0 | yes | 60 | 0 | 100 | 1500 | nmt | 1.0 E + 12 | 2.0 E + 13 |
| 12 | $CH_3OH$ | 5.0 | yes | 60 | 0 | 800 | 200 | nmt | 3.0 E + 13 | 2.0 E + 13 |
| 13 | $CH_3OH$ | 2.5 | yes | 60 | 0 | 0 | 3750 | >99.9 | 1.0 E + 13 | 2.0 E + 13 |
| 14 | $CH_3OH$ | 1.0 | yes | 60 | 0 | −100 | 600 | nmt | 1.0 E + 13 | 2.0 E + 13 | phr = parts per hundred of base component
RH = relative humidity
C. = degree centrigrade
60 sec = charge time
th = sample thickness
nmt = no measurement taken

TABLE 2

ANTISTATIC PROPERTIES FOLLOWING TREATMENT

| SAMPLE # | TREATMENT TIME (SEC) | ANTISTATIC AGENT[1] (Wt. %) | INITIAL CHARGE (KV) | ACCEPTED CHARGE (KV) | 90% DECAY TIME AT 50% RH (sec) | 90% DECAY TIME AT 20% RH (sec) | Rs AT 50% RH (OHM/SQ.) | Rs AT 20% RH (OHM/SQ.) |
|---|---|---|---|---|---|---|---|---|
| 15 | — | 0.000 | 5 | — | >99 | >99 | $10^{13}$ | $10^{14}$ |
| 16 | 2 | 0.0156 | 0 | 5 | 0.02 | 0.31 | $10^9$ | $10^{10}$ |
| 17 | 5 | 0.0172 | 0 | 5 | 0.01 | 0.31 | $10^9$ | $10^{10}$ |

TABLE 2-continued

| | | ANTISTATIC PROPERTIES FOLLOWING TREATMENT | | | | | | |
|---|---|---|---|---|---|---|---|---|
| SAMPLE # | TREATMENT TIME (SEC) | ANTISTATIC AGENT[1] (Wt. %) | INITIAL CHARGE (KV) | ACCEPTED CHARGE (KV) | 90% DECAY TIME AT 50% RH (sec) | 90% DECAY TIME AT 20% RH (sec) | $R_s$ AT 50% RH (OHM/SQ.) | $R_s$ AT 20% RH (OHM/SQ.) |
| 18 | 10 | 0.0218 | 0 | 5 | 0.01 | 0.23 | $10^9$ | $10^{10}$ |
| 19 | 30 | 0.0266 | 0 | 5 | 0.01 | 0.15 | $10^9$ | $10^{10}$ |

[1]Tetrahexyl ammonium bromide.

TABLE 3

| | EFFECT OF POST-TREATMENT ON ANTISTATIC PROPERTIES | | | |
|---|---|---|---|---|
| POST-TREATMENT | 90% DECAY TIME AT 50% RH (SEC) | 90% DECAY TIME AT 20% RH (SEC) | $R_s$ AT 50% RH (OHM/SQ.) | $R_s$ AT 20% RH (OHM/SQ.) |
| NONE | 0.01 | 0.02 | $5 \times 10^9$ | $8 \times 10^9$ |
| WATER WASH & SCRUBB | 0.01 | 0.08 | $1 \times 10^{10}$ | $6 \times 10^{10}$ |
| WINDEX/WATER WASH | 0.01 | 0.04 | $4 \times 10^9$ | $6 \times 10^{10}$ |
| 30 MIN., COLD WATER WASH | 0.07 | 0.81 | $8 \times 10^{10}$ | $8 \times 10^{11}$ |
| 30 MIN., HOT WATER WASH | 1.54 | 18.64 | $1 \times 10^{12}$ | $2 \times 10^{12}$ |
| ANTISTAT SOLVENT WASH | >99 | >99 | $1 \times 10^{13}$ | $1 \times 10^{14}$ |

TABLE 4

| EFFECT OF TIME ON CHARGE DECAY | | |
|---|---|---|
| TIME (MONTH) | 90% DECAY TIME AT 50% RH (SEC) | R AT 50% RH (OHM/SQ.) |
| 0 | 0.01–0.03 | $5 \times 10^9 – 7 \times 10^9$ |
| 2 | 0.01–0.03 | $5 \times 10^9 – 7 \times 10^9$ |
| 4 | 0.01–0.03 | $5 \times 10^9 – 7 \times 10^9$ |

What is claimed is:

1. A method of incorporating at least one antistatic agent into a thermoplastic polymer which comprises the step of contacting a polyvinyl chloride polymer with a solution comprising a solvent capable of swelling the PVC surface and at least one antistatic agent selected from the group consisting of 1-dodecylpyridinium chloride monohydrate and $(R^1)_n(R^2)_m$ ammonium halide, wherein n and m are integers of from 0–4 and n+m=4, and wherein $R^1$ and $R^2$ can be different or the same and are alkyl groups of from 1 to 20 carbon atoms.

2. The method of claim 1, wherein the antistatic agent is selected from the group consisting of 1-dodecylpyridinium chloride monohydrate, (heptyl)$_n$(octyl)$_m$ ammonium bromide and (hexyl)$_n$(octyl)$_m$ ammonium bromide, wherein n is an integer of from 2–4, m is an integer of from 0–2, and n+m=4.

3. The method of claim 1, wherein the antistatic agent is 1-dodecylpyridinium chloride monohydrate.

4. The method of claim 1, wherein the antistatic agent is tetrahexyl ammonium bromide.

5. The method of claim 1, wherein the solvent is methylene chloride.

6. The method of claim 2, wherein the solvent is methylene chloride.

7. The method of claim 3, wherein the solvent is methylene chloride.

8. The method of claim 4, wherein the solvent is methylene chloride.

9. The method of claim 1, wherein the solvent is dimethyl sulfoxide or N-methyl pyrrolidone.

10. The method of claim 2, wherein the solvent is dimethyl sulfoxide or N-methyl pyrrolidone.

11. The method of claim 3, wherein the solvent is dimethyl sulfoxide or N-methyl pyrrolidone.

12. The method of claim 4, wherein the solvent is dimethyl sulfoxide or N-methyl pyrrolidone.

13. The method of claim 1, wherein the antistatic agent is in a concentration by weight in the solvent of from about 1% to about 30%.

14. The method of claim 13, wherein the antistatic agent is in a concentration by weight in the solvent of from about 10% to about 20%.

15. The method of claim 1, wherein the solution is contacted with the PVC from about 2 to about 60 seconds.

16. A method of incorporating at least one antistatic agent into a thermoplastic polymer which comprises the step of contacting a polyvinyl chloride polymer with a solution comprising methylene chloride solvent and from about 1% to about 30% by weight in the methylene chloride solvent of a tetrahexyl ammonium bromide antistatic agent.

17. An antistatic solution composition comprising a solvent capable of swelling a PVC surface and at least one antistatic agent selected from the group consisting of 1-dodecylpyridinium chloride monohydrate and $(R^1)_n(R^2)_m$ ammonium halide, wherein n and m are integers of from 0–4 and n+m =4, and wherein $R^1$ and $R^2$ can be different or the same and are alkyl groups of from 1 to 20 carbon atoms.

18. The composition of claim 17, wherein the antistatic agent is selected from the group consisting of 1-dodecylpyridinium chloride monohydrate, (heptyl)$_n$(octyl)$_m$ ammonium bromide and (hexyl)$_n$(octyl)$_m$ ammonium bromide, wherein n is an integer of from 2–4, m is an integer of from 0–2, and n+m=4.

19. The composition of claim 17, wherein the antistatic agent is 1-dodecylpyridinium chloride monohydrate.

20. The composition of claim 17, wherein the antistatic agent is tetrahexyl ammonium bromide.

21. The composition of claim 17, wherein the solvent is methylene chloride.

22. The composition of claim 18, wherein the solvent is methylene chloride.

23. The composition of claim 19, wherein the solvent is methylene chloride.

24. The composition of claim 20, wherein the solvent is methylene chloride.

25. The composition of claim 17, wherein the solvent is dimethyl sulfoxide or N-methyl pyrrolidone.

26. The composition of claim 18, wherein the solvent is dimethyl- sulfoxide or N-methyl pyrrolidone.

27. The composition of claim 19, wherein the solvent is dimethyl sulfoxide or N-methyl pyrrolidone.

28. The composition of claim 20, wherein the solvent is dimethyl sulfoxide or n-methyl pyrrolidone.

29. The composition of claim 17, wherein the antistatic agent is in a concentration by weight in the solvent of from about 1% to about 30%.

30. The composition of claim 29, wherein the antistatic agent is in a concentration by weight in the solvent of from about 10% to about 20%.

31. An antistatic solution composition comprising a solvent capable of swelling a PVC surface and at least one antistatic agent selected from the group consisting of 1-dodecylpyridinium chloride monohydrate and $(R^1)_n(R^2)_m$ ammonium halide, wherein n and m are integers of from 0-4 and n+m=4, and wherein $R^1$ and $R^2$ can be different or the same and are alkyl groups of from 1 to 20 carbon atoms, wherein said solvent is methylene chloride, dimethyl sulfoxide or N-methyl pyrrolidone.

32. An antistatic solution composition comprising a solvent capable of swelling a PVC surface and at least one antistatic agent selected from the group consisting of 1-dodecylpyridinium chloride monohydrate, $(heptyl)_n(octyl)_m$ ammonium bromide and $(hexyl)_n(octyl)_m$ ammonium bromide, wherein n is an integer of from 2-4, m is an integer of from 0-2 and n+m=4, wherein said solvent is methylene chloride, dimethyl sulfoxide or N-methyl pyrrolidone.

33. An antistatic solution composition comprising a solvent capable of swelling a PVC surface and at least one antistatic agent, wherein said antistatic agent is 1-dodecylpyridinium chloride monohydrate.

34. An antistatic solution composition comprising a solvent capable of swelling a PVC surface and at least one antistatic agent, wherein said antistatic agent is 1-dodecylpyridinium chloride monohydrate, and said solvent is methylene chloride, dimethyl sulfoxide or N-methyl pyrrolidone.

35. An antistatic solution composition comprising a solvent capable of swelling a PVC surface and at least one antistatic agent, wherein said antistatic agent is tetrahexyl ammonium bromide, and said solvent is methylene chloride, dimethyl sulfoxide or N-methyl pyrrolidone.

* * * * *